United States Patent Office 3,061,576
Patented Oct. 30, 1962

3,061,576
FILAMENT COMPRISING POLYPROPYLENE AND A CAPROLACTAM-COATED PIGMENT AND METHOD OF MAKING SAME
Charles P. Roth, Urbana, Ill., and Joseph C. Webnar, Cuyahoga County, Ohio, assignors, by mesne assignments, to Hercules Powder Company, Wilmington, Del., a corporation of Delaware
No Drawing. Filed Mar. 3, 1960, Ser. No. 12,507
8 Claims. (Cl. 260—41)

This invention relates to pigmented articles and to a method of pigmentation; more particularly, however, it relates to color pigmented polyolefin articles and to a method for pigmenting the same.

Polyolefin filamentary articles such as filaments, yarns, cords and the like, besides being relatively inexpensive, possess excellent abrasion resistance, tenacity, and resiliency, all of which makes them commercially very valuable. One undesirable characteristic, however, which polyolefin substances share with certain other synthetics used in the textile industry, is that they contain few if any dye sites and consequently have little or no dye affinity. Polyolefin filaments, therefore, are not only difficult to dye by conventional methods, but the resulting colors are not fast, and they fade rapidly in the presence of sunlight or during the cleaning of fabrics made from such filaments. Synthetic articles must be available in a wide range of colors, if they are to enjoy widespread use, and the colors must be relatively stable.

Several methods have been suggested for coloring such difficultly dyeable synthetic filaments. In one of these methods, a color pigment is mixed with the molten, filament forming polymer which is to be colored, and the pigmented polymer is subsequently extruded to yield colored filaments or other desired shapes. This method of coloration, known as "spin dyeing," produces exceptionally color fast materials and, in addition, permits the production of filaments in a wide variety of colors. Unfortunately, however, when pigments are added to polymers in such a fashion, the pigment particles have a tendency to coalesce into aggregates which frequently lodge in the minute orifices of the spinneret and either partially or completely block them. In addition, it is very difficult to obtain a satisfactorily uniform distribution of the pigment when such a process is used.

Another method which has been proposed comprises combining the color pigments with a small portion of the polymer to be colored to form a "master batch," and then mixing the latter composition into the main portion of the polymer by means of a mill, banbury mixer, or similar device. When the relatively small master batches are added to comparatively large quantities of polymer, however, the mixing time required for dispersion is excessive, and a uniform dispersion is extremely difficult to achieve. Also, since the materials are extremely difficult to mix, such a procedure requires large, heavy duty, and costly equipment.

Still another method which has been suggested for coloring hard-to-dye synthetic articles is one which involves the incorporation of an easily dyeable material into the polymer so that the resulting mixture can be dyed in a conventional manner. This method, however, necessitates the addition of substantial amounts of a foreign material into the polymer and consequently tends to alter the latter's physical properties. Such a method also creates difficulties connected with product composition control and results in increased costs.

Now a method has been found which produces pigment colored polyolefin articles having a substantially uniform distribution of dispersive pigment particles. The pigmented articles produced have exceptionally good color stability when compared with conventionally dyed polyolefin articles and can be made in a wide range of colors. The method of pigmentation contemplated by the present invention can be accomplished in comparatively simple equipment and is relatively inexpensively and easily performed. In addition, the pigmented polyolefin articles produced have substantially unimpaired physical properties.

In accordance with this invention, polyolefin articles are pigmented by a process which comprises coating polyolefin material with epsilon caprolactam coated pigment particles, and melt extruding the coated polyolefin material to produce substantially uniformly pigmented articles.

One of the major problems encountered in coloring polymeric articles with pigments is the tendency of the pigment particles to coalesce into aggregates which block spinneret orifices and interfere with proper distribution of the pigment. Surprisingly, the tendency of the pigment particles to coalesce into aggregates is substantially reduced when the particles are coated with epsilon caprolactam. While the invention is not conditioned on the theory, it is believed that pigment particles which are substantially surrounded by epsilon caprolactam tend to retain their electrical charge, and inasmuch as the charge on each of the particles is identical, the latter are mutually repellent and resist coalesence. In addition, the coating serves as a physical barrier, and as such, it acts to prevent the contacts which promote adhesion between the particles. Whatever the reason, however, polyolefin material which has been coated with epsilon caprolactam covered pigment can be melt-extruded relatively free of aggregates into pigmented articles which have a substantially uniform distribution of pigments.

The polyolefin material to be coated can conveniently first be extruded into a relatively thin, continuous, wire-like monofilament and subsequently can be cut into small pieces, however, other shapes and forms can also be effectively coated. In one variation of the coating process, i.e., the "dry" coating process, relatively small pieces or "chips" of the polyolefin are mixed with comparatively small particles of epsilon caprolactam covered pigment until the chips are substantially covered with the caprolactam covered pigment. In another variation, the "wet" coating process, a mixture of chips and epsilon caprolactam coated pigment is heated at least to the melting point of the epsilon caprolactam, and the materials are mixed until the chips are substantially coated with the epsilon caprolactam and pigment. In either case, following the coating operation, the coated chips are melted and extruded into any desired shape such as filaments, rods, films and the like in suitable screw extrusion equipment or similar devices.

Pigments suitable for the purposes of the invention should be capable of withstanding the physical conditions, including temperature, pressure, and the like, which are involved in the subsequent extrusion processing of the coated polyolefin material, and the use of pigments capable of withstanding a temperature of at least 290° C. for at least about 30 minutes without being appreciably deleteriously affected is particularly advantageous. In addition, suitable pigments should not be adversely affected when extruded with the epsilon caprolactam and polyolefin, i.e., while a reaction between the pigment and the epsilon caprolactam or polyolefin is not harmful per se, one which undesirably affects the color or other property of the pigmented article produced is to be avoided. Although any pigments, either organic or inorganic, or mixtures of them, possessing the above described characteristics are suitable, particular advantages have been found in the use of inorganic pigments. Examples of pigments suited to the purpose of the invention are, for instance, inorganic pigments such as ultramarine blue and cadmium yellow, both of which are described in the "Colour Index," vol. 3, 2nd ed., 1956, on pages 3605 and 3610 respectively, or an organic pigment such as, for instance, phthalocyanine green, which is described on page 3572 of the above reference.

While considerable latitude is permissible in the selection of the pigment particle size, when the pigmented polyolefin is to be extruded into filaments, the particle size of the pigments employed obviously must be less than the size of the spinneret orifices, and it has been found that greater and more uniform pigment coverage, as well as increased filament strengths, results if the ratio of the diameter of the pigment to the diameter of the "finished" (extruded and drawn) filaments is no less than about 1 to 3. In the preferred embodiment of the invention, however, a ratio of no less than about 1 to 18 is employed. While the amount of pigment used will, of course, be varied to suit the practioner's requirements of color intensity and the like, advantageously it should constitute no more than 10% by weight of the pigmented article.

The epsilon caprolactam used in the pigmentation process serves several functions. In the dry coating process, it permits the formation of coated pigment particles possessing an affinity for polyolefin surfaces which enables them to adhere to and coat the surfaces of the chips. In addition, while the epsilon caprolactam has sufficient attraction for polyolefin surfaces to establish adequate bonding thereto, it has a minimum attraction for itself, i.e., while the coated pigment particles coat the polyolefin chips, the particles have little tendency to adhere to and form agglomerates with themselves. In addition, in both the wet and dry coating processes, surrounding the pigment particles with epsilon caprolactam substantially reduces the propensity of the pigment to coalesce into aggregates which plug spinneret holes and interfere with pigment distribution in the extruded articles, an effect which is of particular importance. The epsilon caprolactam monomer is better suited for coating the pigment than polycaprolactam because the monomer has a greater affinity for polyolefin surfaces, is less likely to create compatibility problems, and in the amount used, the physical properties of the polyolefin are substantially unaffected. Use of the monomer also permits lower temperatures to be employed in the wet coating process inasmuch as the monomer melts at about 68° C. while the polymer must be heated to approximately 215° C. before it can be melted.

Although the amount of epsilon caprolactam used to coat the pigment is not critical, it should constitute, in the pigmented article produced, no more than about 4% by weight of the polyolefin therein since when more than that amount is present the surplus tends to "bleed" out of the pigmented article. Not all of the epsilon caprolactam coated on the pigment is incorporated in the pigmented article, however, appreciable amounts of it being lost by, among other things, evaporation from the molten pigmented polyolefin at the face of the extrusion device. The amount of epsilon caprolactam, therefore, which can be coated on the pigment without causing the concentration of the epsilon caprolactam in the pigmented article to rise about the 4% level depends to a large extent on the processing conditions employed in the extrusion and can be determined by simple experimentation. In the preferred embodiment of the invention, the amount of epsilon caprolactam used is that amount which is necessary to just coat the pigment particles.

The coating of the pigment with epsilon caprolactam can be satisfactorily accomplished in a number of ways. For instance, melted epsilon caprolactam, together with the desired pigment, may be inserted into a colloid mill and circulated therein until a uniform dispersion results. If dry coating is to be employed, the mixture is subsequently discharged from the mill, solidified, and attrited by any of the well-known methods, as for instance by a ball mill, until the desired particle size is achieved. If the wet process is to be used, the molten mixture can be added directly to the wet mixer, or alternatively, the mixture may be treated as in the case when dry coating is to be employed. In still another method, the epsilon caprolactam is dissolved in any suitable solvent such as for instance ethyl ether, ethyl alcohol, etc., and suitably sized pigment particles are added to the solution. After the pigment particles have been coated with the solution, the solvent is evaporated leaving an epsilon caprolactam coating on the pigment.

Several satisfactory methods, including both a wet and a dry process, have been found for coating the polyolefin chips with the epsilon caprolactam coated pigment. In the dry coating process, the polyolefin chips and the particles of epsilon caprolactam coated pigment are combined in any suitable mixing equipment such as for instance a ribbon mixer, rotary drum mixer, cone blender or the like, and the mixture is agitated until substantial coating of the chips has been achieved. The mixing time required for coating varies with the kind and the size of coated pigment and ships used, however, it may easily be determined by periodic visual examination of the mixer's contents during mixing. In both the dry and the wet coating processes, the size of the chips may be widely varied, however, it has been found that the smaller the size of the polyolefin chips used, the better and more uniform is the pigment distribution which results, and the greater is the amount of pigment which can be coated on the chips. While in the preferred embodiment of the invention relatively small polypropylene chips are used, i.e., those having a surface area of no more than about 100 square millimeters, larger chips can be coated, and in addition, it is possible to successfully coat continuous ribbons, rods, films, or other shapes with the epsilon caprolactam encapsulated pigments by varying the coating technique. Advantageously, the chips are screened or otherwise processed following dry coating to eliminate any excess, unadhereing particles of coated pigment. Screening can be accomplished with any of a variety of well-known types of equipment such as vibrating, shaking, or oscillating screens and the like.

While the dry mix coating process is satisfactory for the purposes of the invention, it has been found to be of particular advantage to use a wet coating process. In the wet coating process, the polyolefin chips and epsilon caprolactam coated pigment are combined in mixing devices equipped with means for heating the charge during mixing. Any type of mixing equipment, such as, for instance, any of those mentioned above as being suitable for the dry coating process, when equipped with heating means such as steam jacketing, electrical strip heaters or the like, performs satisfactorily in the wet coating process. When this process is employed, the mixer's contents are heated to at least the melting temperature of the epsilon caprolactam, approximately 68° C., and mixing and heating are continued until the chips are substantially coated with the epsilon caprolactam and pigment. Although it depends somewhat on the size of the chips being coated, the type of equipment used, and like considerations, coating usually requires about an hour to accomplish. Following coating, the coated chips are discharged from the mixer and are ready for subsequent processing.

Due to the relatively high viscosity of molten polyolefins at temperatures lower than their decomposition temperature, it has been found that they can be shaped most efficiently by being melted and extruded in ordinary screw extrusion equipment, however, other similar devices may be used. During the melting and extrusion process, the pigment becomes substantially uniformly dispersed throughout the polymer. All manner of pigmented shapes such as filaments, rods, ribbons, films, and the like, can be formed in the above manner.

While the herein disclosed invention can be utilized to pigment any of the various polyolefin substances such as polyethylene, polypropylene, polybutylene, and the like, it has been found to be particularly well suited to pigmenting stereo-regulated polyolefins, and in the preferred embodiment of the invention stereo-regulated polypropylene is employed.

The following examples while not intended to be limiting in nature are illustrative of the invention.

Example I

A jacketed twin cone blender preheated with hot water to a temperature of 75° C. was charged with 227 grams of ultramarine blue pigment particles, approximately 1.5 microns in diameter, dispersed in 227 grams of epsilon caprolactam, and with 100 pounds of polypropylene in the form of chips having an average surface area of approximately 52 square millimeters each. The blender was sealed and rotation commenced. After 50 minutes, the contents reached a temperature of approximately 74° C., and rotation was continued at that temperature for an additional hour. Rotation was then stopped, and the mixer's contents were discharged into a container. The coated chips were for the most part free flowing, and the few aggregates which were present were quite friable and easily broken apart. The coated chips were subsequently charged into a 1½ inch screw extruder and extruded at a spin head temperature of about 280° C., through a spinneret having 35 holes, 0.12 inch long, and 0.03 inch in diameter. The melted polymer, which had a reduced specific viscosity (as defined below) of approximately 2.6, was supplied to the spinneret at a rate of 80 grams per minute and extruded into a spinning chimney in the form of filaments. The molten filaments were solidified by being transversely blown with air and subsequently were taken up at the bottom of the chimney at about 400 meters per minute. The filaments, which had an epsilon carprolactam content of less than 4.0 weight percent (based on the polypropylene present), after being drawn 3.7 times their original length had a diameter of approximately 46 microns, a tenacity of 6 grams per denier, and an elongation at break of 25.3%. The pigment, which constituted approximately 0.5% by weight of the filaments, was uniformly dispersed throughout the filaments, and no appreciable color break (change) was discernible after exposure of the filaments under a carbon arc lamp for 200 hours.

Example II

A cylindrical ball mill from which the balls had been removed was charged with 19.5 grams of cadmium yellow pigment particles, approximately 0.5 micron in diameter, dispersed in 6.5 grams of epsilon caprolactam, and with 3 pounds of polypropylene in the form of chips having an average surface area of approximately 52 square millimeters each. The mill was sealed, rotated at room temperature for 3 hours, and its contents were discharged onto a U.S. standard #10 mesh vibrating screen. The material retained on the screen was charged into a 1½ inch screw extruder, and the extrusion and subsequent processing were carried out in the manner disclosed in Example I. The finished filaments had a diameter of approximately 46 microns, an epsilon caprolactam content of less than 4.0 weight percent (based on polypropylene), a tenacity of 6.5 grams per denier, and an elongation at break of 23.8%. The pigment, which constituted approximately 1.2% by weight of the filaments, was uniformly dispersed throughout the filaments, and no appreciable color break was discernible after exposure of the filaments under a carbon arc lamp for 200 hours.

Example III

An unjacketed twin cone blender was charged with 430 grams of phthalocyanine green pigment particles, approximately 0.3 micron in diameter, dispersed in 430 grams of epsilon caprolactam, and with 100 pounds of polypropylene in the form of chips having an average surface area of approximately 52 square millimeters each. The blender was sealed and then rotated at room temperature for 1½ hours. Following rotation, the contents were discharged onto a U.S. standard #10 mesh vibrating screen, and the material retained thereon was charged to an extruder of the type described in Example I, the filaments being formed and processed as therein disclosed. The finished filaments had a diameter of approximately 46 microns, an epsilon caprolactam content of less than 4.0 weight percent (based on polypropylene), a tenacity of 6.2 grams per denier, and an elongation at break of 23.0%. The pigment was uniformly dispersed throughout the filaments, and no appreciable color break was discernible after exposure under a carbon arc lamp for 200 hours.

A control utilizing unpigmented polypropylene in the form of chips having an average surface area of approximately 52 square millimeters each was also run. The unpigmented chips were charged into a 1½ screw extruder and extruded and processed in the same manner as that described in the examples. The molten polymer had a reduced specific viscosity of about 2.61 (approximately the same as that of the pigmented polypropylene in the examples) indicating that substantially no degradation of the polymer had occurred because of the pigments. The extruded filaments after being drawn 3.7 times had a tenacity of 5.9 grams per denier and an elongation at break of 26.6%, further indicating no adverse effects due to the pigment's presence.

Reduced specific viscosity, which is considered to reflect polymer chain length (the higher the R.S.V. the greater the chain length) and hence to indicate whether the polymer has been degraded or not, is determined by the equation:

$$R.S.V. = \frac{\frac{Ts}{Tb} - 1}{0.1}$$

In which R.S.V. equals the reduced specific viscosity; $Ts$ is the number of seconds required for a 0.1% by weight solution of polymer in decahydronaphtalene, heated to 135° C., to pass through a Cannon Fiske No. 100 viscosimeter; and $Tb$ is the number of seconds required for pure decahydronaphthalene at 135° C. to pass through the same viscosimeter.

As many widely different embodiments of this invention may be made without departing from the spirit thereof, it is to be understood that the invention is not limited to the foregoing examples or descriptions except as indicated in the following appended claims.

What is claimed is:

1. A process for pigmenting polypropylene articles comprising coating polypropylene material with epsilon caprolactam coated pigment particles, melting the coated polypropylene material, and extruding the molten mass into articles thereby producing substantially uniformly pigmented polypropylene articles.

2. A process for pigmenting polypropylene articles comprising coating polypropylene material with a mixture comprised of epsilon caprolactam in an amount such that it constitutes, in the pigmented articles produced, no more than about 4% by weight of the polypropylene therein, and a pigment having a particle size smaller than the holes through which the coated polypropylene is to be extruded, said pigment being substantially surrounded by epsilon caprolactam and capable of melt extrusion with the polypropylene and epsilon caprolactam without being substantially deleteriously affected by the physical conditions of extrusion and by the polypropylene and epsilon caprolactam; and melt extruding the coated polypropylene material into articles thereby producing substantially uniformly pigmented articles.

3. A process for pigmenting polypropylene filaments comprising coating polypropylene chips with a mixture comprised of molten epsilon caprolactam in an amount such that the epsilon caprolactam constitutes, in the pigmented filaments produced, no more than about 4% by weight of the polypropylene therein, and a pigment having a particle size such that the ratio of the diameter of the particles to the diameter of the finished filaments is no less than about 1 to 18, said pigment being substantially surrounded by epsilon caprolactam and capable of melt extrusion with the polypropylene and epsilon caprolactam without being substantially deleteriously affected by the physical conditions of extrusion and by the polypropylene and epsilon caprolactam; and melt extruding the coated polypropylene chips into filaments thereby producing substantially uniformly pigmented filaments.

4. A pigmented composition comprising polypropylene; a pigment; and no more than about 4% by weight of the polypropylene present of epsilon caprolactam.

5. Pigmented drawn filaments comprising polypropylene; no more than about 4% by weight of the polypropylene present of epsilon caprolactam; and a pigment having a particle size such that the ratio of the diameter of the pigment particles to the diameter of said drawn filaments is no less than about 1 to 3, said pigment being capable of melt extrusion with the polypropylene and epsilon caprolactam without being substantially deleteriously affected by the physical conditions of extrusion and by the polypropylene and epsilon caprolactam.

6. Pigmented drawn filaments comprising polypropylene; no more than about 4% by weight of the polypropylene present of epsilon caprolactam; and no more than about 10% by weight of the filaments of a pigment having a particle size such that the ratio of the diameter of the pigment particles to the diameter of said drawn filaments is no less than about 1 to 18, said pigment being capable of melt extrusion with the polypropylene and epsilon caprolactam without being substantially deleteriously affected by the physical conditions of extrusion and by the polypropylene and epsilon caprolactam.

7. A process for coating polypropylene material, useful in the manufacture of pigmented polypropylene articles, comprising coating polypropylene material with a mixture comprised of molten epsilon caprolactam in an amount such that the epsilon caprolactam will constitute, in the pigmented articles to be produced, no more than about 4% by weight of the polypropylene therein, and a pigment, said pigment being substantially surrounded by said epsilon caprolactam and capable of melt extrusion with the polypropylene and epsilon caprolactam without being substantially deleteriously affected by the physical conditions of extrusion and by the polypropylene and epsilon caprolactam.

8. An article of manufacture, useful in making pigmented polypropylene articles, comprising polypropylene chips coated with epsilon caprolactam in an amount such that the latter will constitute, in the polypropylene articles to be produced, no more than about 4% by weight of the polypropylene therein, and a pigment substantially surrounded by said epsilon caprolactam, said pigment being capable of melt extrusion with the polypropylene and epsilon caprolactam without being substantially deleteriously affected by the physical conditions of extrusion and by the polypropylene and epsilon caprolactam.

References Cited in the file of this patent

UNITED STATES PATENTS

| | | |
|---|---|---|
| 2,404,719 | Houtz | July 23, 1946 |
| 2,686,764 | Geister et al. | Aug. 17, 1954 |
| 2,839,422 | Beyer et al. | June 17, 1958 |

OTHER REFERENCES

"Modern Plastics," August 1954, pages 104 and 105 relied upon.

"Fibres and Plastics," January 1960, pages 15 and 16 relied upon.